United States Patent
Wu et al.

(10) Patent No.: US 12,512,076 B2
(45) Date of Patent: Dec. 30, 2025

(54) LIQUID CRYSTAL DISPLAY DEVICE, METHOD FOR DISPLAYING IMAGE, ELECTRONIC DEVICE, AND READABLE STORAGE MEDIUM

(71) Applicant: BOE Technology Group Co., Ltd., Beijing (CN)

(72) Inventors: Qiong Wu, Beijing (CN); Xiangjun Peng, Beijing (CN); Xin Duan, Beijing (CN); Ce Ning, Beijing (CN); Lizhong Wang, Beijing (CN); Yifan Hou, Beijing (CN); Shuo Zhang, Beijing (CN); Huiling Xue, Beijing (CN); Hui Guo, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 18/777,612

(22) Filed: Jul. 19, 2024

(65) Prior Publication Data

US 2024/0371336 A1 Nov. 7, 2024

Related U.S. Application Data

(63) Continuation of application No. PCT/CN2023/086310, filed on Apr. 4, 2023.

(51) Int. Cl.
*G09G 3/36* (2006.01)
*G06F 3/01* (2006.01)
(Continued)

(52) U.S. Cl.
CPC .......... *G09G 3/3607* (2013.01); *G06F 3/013* (2013.01); *G09G 3/2092* (2013.01);
(Continued)

(58) Field of Classification Search
CPC .......... G09G 3/013; G09G 2320/0233; G09G 2320/0242; G09G 2354/00; G09G 3/2092; G09G 3/3413; G09G 3/36; G09G 3/3607

See application file for complete search history.

(56) References Cited

U.S. PATENT DOCUMENTS

| 2016/0147063 A1* | 5/2016 | Border | G09G 3/2003 |
| | | | 345/592 |
| 2017/0098406 A1* | 4/2017 | Kobayashi | G09G 5/10 |

(Continued)

FOREIGN PATENT DOCUMENTS

| CN | 103956144 A | 7/2014 |
| CN | 106062861 A | 10/2016 |

(Continued)

OTHER PUBLICATIONS

International Search Report and Written Opinion mailed on Dec. 17, 2023, in corresponding PCT/CN2023/086310, 11 pages.

*Primary Examiner* — Kenneth Bukowski
(74) *Attorney, Agent, or Firm* — XSENSUS LLP

(57) ABSTRACT

A liquid crystal display device, a method for displaying an image, and an electronic device are provided. In the first operation mode, a control circuit of the display device is configured to: receive display data of an $m^{th}$ image frame, and control the display device to display n sub-field images. The display data includes initial gray scales under n base colors. In a sub-field image of the $m^{th}$ image frame: pixels include a target pixel, and an actual gray scale of the target pixel is an average of an intermediate gray scale and initial gray scales of T non-target pixels. An actual gray scale of at least a part of non-target pixels is an initial gray scale thereof. The target pixel meets at least one of a first condition and a second condition.

19 Claims, 8 Drawing Sheets

(51) Int. Cl.
*G09G 3/20* (2006.01)
*G09G 3/34* (2006.01)

(52) U.S. Cl.
CPC ... *G09G 3/3413* (2013.01); *G09G 2320/0233* (2013.01); *G09G 2320/0242* (2013.01); *G09G 2354/00* (2013.01)

(56) References Cited

U.S. PATENT DOCUMENTS

| | | | | |
|---|---|---|---|---|
| 2017/0221407 A1* | 8/2017 | Kobayashi | ........... | G09G 3/2022 |
| 2017/0300501 A1* | 10/2017 | Duminy | ................ | G06F 16/258 |
| 2017/0330501 A1* | 11/2017 | Kobayashi | ........... | G09G 3/3406 |
| 2018/0130432 A1* | 5/2018 | Cui | ..................... | G09G 3/3406 |
| 2019/0251919 A1* | 8/2019 | Ishihara | ............... | G09G 3/3607 |

FOREIGN PATENT DOCUMENTS

| | | | | | |
|---|---|---|---|---|---|
| CN | 106652928 | A | | 5/2017 | |
| CN | 106062861 | B | * | 6/2019 | ............ G06F 3/013 |
| CN | 109690668 | B | | 1/2021 | |
| CN | 113823234 | A | | 12/2021 | |
| JP | 2003-140617 | A | | 5/2003 | |
| JP | 2003140617 | | * | 1/2008 | |

* cited by examiner

LIQUID CRYSTAL DISPLAY DEVICE, METHOD FOR DISPLAYING IMAGE, ELECTRONIC DEVICE, AND READABLE STORAGE MEDIUM

CROSS-REFERENCE TO RELATED APPLICATION

The present application is a continuation application of International Application No. PCT/CN2023/086310, filed on Apr. 4, 2023, and the entire contents thereof are incorporated herein by reference for all purposes.

TECHNICAL FIELD

The present disclosure relates to the field of display technology, in particular to a liquid crystal display device, a method for displaying an image, an electronic device, and a readable storage medium.

BACKGROUND

The display panel is an indispensable part of an electronic device such as a television, a mobile phone, etc. The liquid crystal display panel is a kind of display panel which is widely used. The existing liquid crystal display panel has high light loss and energy consumption during the light emitting process.

It should be noted that the information disclosed in the above section is only used to enhance the understanding of the background of the present disclosure, and thus can include information that does not constitute the prior art already known to those of ordinary skill in the art.

SUMMARY

The present disclosure provides a liquid crystal display device, a method for displaying an image, an electronic device, and a readable storage medium.

According to one aspect of the present disclosure, a liquid crystal display device is provided, including a liquid crystal display panel and a control circuit, wherein the liquid crystal display panel includes multiple pixels; the control circuit includes a first operation mode, and in the first operation mode, the control circuit is configured to control, in response to receiving display data of an $m^{th}$ image frame, the liquid crystal display device to display n sub-field images in sequence, to obtain the $m^{th}$ image frame, wherein the display data includes initial gray scales of each pixel under n base colors, a tone of one sub-field image is one of the base colors, and tones of different sub-field images are different, where m and n are positive integers, and n≥2; in any sub-field image of the $m^{th}$ image frame: the pixels include a target pixel and non-target pixels, the non-target pixels include multiple neighborhood pixels adjacent to the target pixel and non-neighborhood pixels located outside the neighborhood pixels, an actual gray scale of the target pixel is an average of an intermediate gray scale of the target pixel and initial gray scales of T non-target pixels, wherein the intermediate gray scale is determined based on an initial gray scale of the target pixel, the target pixel and the T non-target pixels are located within a first filtering template, and an actual gray scale of the at least a part of the non-target pixels is an initial gray scale thereof, where T≥1; the target pixel meets at least one of a first condition and a second condition, the first condition is that in a target color gamut in a reference color space, a distance between a target point that reflects a color of the target pixel and a white point is less than a distance threshold, and the second condition is that reference brightness of the target pixel, which is determined based on the initial gray scales of the target pixel under the n base colors, is greater than a brightness threshold, and/or, the second condition is that contrast of the target pixel, which is determined based on the reference brightness of the target pixel and reference brightness of H neighborhood pixels adjacent to the target pixel, is greater than a contrast threshold, where H≥1.

According to one aspect of the present disclosure, an electronic device is provided, the electronic device includes the liquid crystal display device mentioned above.

According to one aspect of the present disclosure, a method for displaying an image is provided, the method is applied to a liquid crystal display device, the liquid crystal display device includes a liquid crystal display panel and a control circuit, the liquid crystal display panel includes multiple pixels, and the method for displaying an image includes: in a first operation mode: receiving display data of an $m^{th}$ image frame, wherein the display data includes initial gray scales of each pixel under n base colors, where m and n are positive integers, and n≥2; selecting, under each of the base colors, a pixel that meets at least one of a first condition and a second condition as a target pixel, wherein pixels other than the target pixel are determined as non-target pixels, pixels adjacent to the target pixel in the non-target pixels are determined as neighborhood pixels, and pixels located outside the neighborhood pixels in the non-target pixels are determined as non-neighborhood pixels, and wherein the first condition is that in a target color gamut in a reference color space, a distance between a target point that reflects a color of the target pixel and a white point is less than a distance threshold, and the second condition is that reference brightness of the target pixel, which is determined based on the initial gray scales of the target pixel under the n base colors, is greater than a brightness threshold, and/or, the second condition is that contrast of the target pixel, which is determined based on the reference brightness of the target pixel and reference brightness of H neighborhood pixels adjacent to the target pixel, is greater than a contrast threshold, where H≥1; and executing a display step under each of the base colors, to obtain the $m^{th}$ image frame, wherein the display step includes: determining an average of an intermediate gray scale of the target pixel and initial gray scales of T non-target pixels within a first filtering template as an actual gray scale of the target pixel, and determining an initial gray scale of at least a part of the non-target pixels as an actual gray scale thereof, to display a sub-field image of the $m^{th}$ image frame, wherein the intermediate gray scale is determined based on an initial gray scale of the target pixel, a tone of one sub-field image is one of the base colors, and tones of different sub-field images are different, where T≥1.

According to one aspect of the present disclosure, a computer-readable storage medium is provided, on which a computer program is stored. When the computer program is executed by a processor, the method for displaying an image described above is implemented.

It should be understood that the general description in the above and the detailed description in the following are only illustrative and explanatory, and do not limit the present disclosure.

BRIEF DESCRIPTION OF THE DRAWINGS

The drawings, which are incorporated in and constitute a portion of this specification, illustrate embodiments consistent with the present disclosure and serve together with the specification to explain principles of the present disclosure. It is apparent that the drawings in the following description are only some embodiments of the present disclosure, and for those of ordinary skill in the art, other drawings can also be obtained from these drawings without creative efforts.

DETAILED DESCRIPTION

Figure 1:
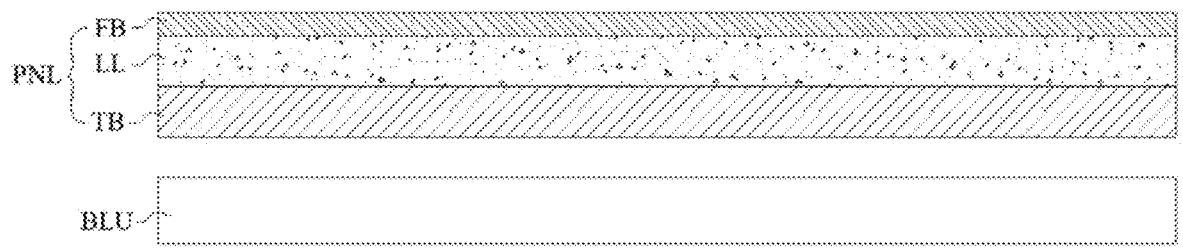
FIG. 1 is a structural schematic diagram of a liquid crystal display device according to embodiments of the present disclosure.

Example embodiments will now be described more fully with reference to the drawings. Example embodiments, however, can be embodied in a variety of forms and should not be construed as being limited to embodiments set forth herein. Instead, these embodiments are provided so that the present disclosure will be thorough and complete, and will fully convey concepts of the example embodiments to those skilled in the art. The same reference numerals in the drawings represent the same or similar structures, and thus their detailed descriptions will be omitted. In addition, the drawings are only illustrative and are not necessarily drawn to scale.

Terms "one", "a", "the", "said", and "at least one" are used to indicate the existence of one or more elements/components/etc. Terms "include" and "has" are used to indicate open inclusion and refer to the existence of additional elements/components/etc. in addition to the listed ones. Terms such as "first", "second" etc. are only used as reference numerals and are not intended to limit the quantity of objects.

A first direction X and a second direction Y herein are two intersecting directions, for example, the two directions are perpendicular to each other, but not limited to horizontal and vertical directions. As a position of the display panel changes, actual orientations of the first direction X and the second direction Y may change.

That "two pixels are adjacent" in the present disclosure refers to the absence of any other pixels between the two pixels. For example, there are no other pixels between a target pixel and a neighborhood pixel of the target pixel.

Figure 2:
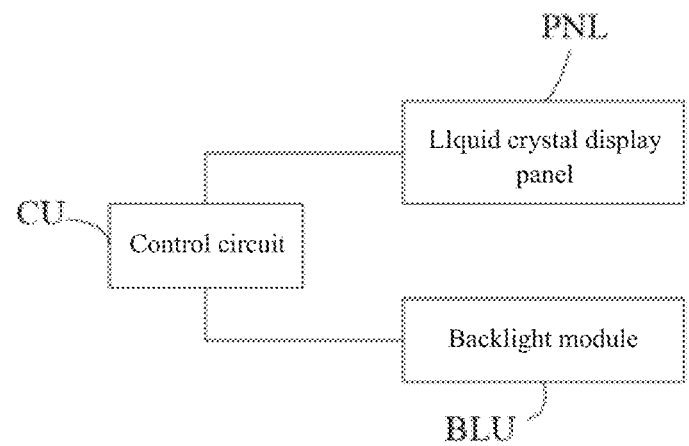
FIG. 2 is a circuit schematic diagram of a liquid crystal display device according to embodiments of the present disclosure.

The present disclosure provides a liquid crystal display device, as shown in FIGS. 1 and 2. The liquid crystal display device can include a liquid crystal display panel PNL and a control circuit CU.

In some embodiments, the liquid crystal display panel PNL includes multiple pixels distributed in an array. The pixel is the minimum emitting unit in the liquid crystal display panel PNL of the present disclosure. The light-emitting colors of different pixels can be different. The liquid crystal display panel PNL can include an array substrate TB and an opposed substrate FB arranged opposite to each other, as well as a liquid crystal layer LL arranged between the array substrate TB and the opposed substrate FB.

The liquid crystal display panel PNL further includes a pixel electrode and a common electrode. The pixel electrode can be arranged on the array substrate TB. The common electrode can be arranged on the array substrate TB or the opposed substrate FB. Each pixel includes one pixel electrode. The array substrate TB includes a driving circuit. The control circuit CU can be arranged on the array substrate TB. The voltage between the pixel electrode and the common electrode can be controlled through the driving circuit, so as to control the deflection degree of the liquid crystal molecules in the liquid crystal layer LL, thereby controlling the light transmittance of each pixel and achieving adjustment of the gray scale of each pixel.

The liquid crystal display device can further include a backlight module BLU, which can be arranged on a side of the array substrate TB away from the opposed substrate FB. The backlight module BLU can emit light to the array substrate TB under the control of the control circuit CU.

In some embodiments, the opposed substrate FB can include a color film layer, which includes multiple filtering parts, and each pixel can include one filtering part. Through the filtering effect of the filtering part, a pixel can emit monochromatic light, and the light-emitting colors of different pixels can be different. However, the color film layer would cause significant light loss, and would reduce the brightness of the liquid crystal display device if the power of the backlight module BLU is not increased. In order to increase the brightness, it is necessary to increase the power of the backlight module BLU, resulting in an increase in power consumption.

In order to improve the light output efficiency without increasing the power consumption, in some embodiments, the opposite substrate FB can be not provided with the color film layer, so as to reduce the light loss and improve the light output efficiency. In order to achieve color display, the backlight module BLU can include light-emitting devices of n different colors, and the number of the light-emitting devices of the same color is not specially limited here, which can be one or more. The color of the light emitted by the backlight module BLU is the tone that forms the image. On this basis, when displaying images, the field sequential display method can be used. For example, n sub-field images are displayed in sequence within one frame time, and each sub-field image is a monochromatic image. In each sub-field image, the gray scales of different pixels can be different, and the gray scales of the same pixel can be different in different sub-field images. The backlight module BLU emits light of the same color when displaying the same sub-field image, and emits light of different colors when displaying different sub-field images. For example, when displaying each sub-field image, only the light-emitting devices being of the same color in the backlight module BLU emit light, so that each sub-field image has only one tone, i.e., one color. The image frame can be obtained based on the persistence of vision.

Figure 3:
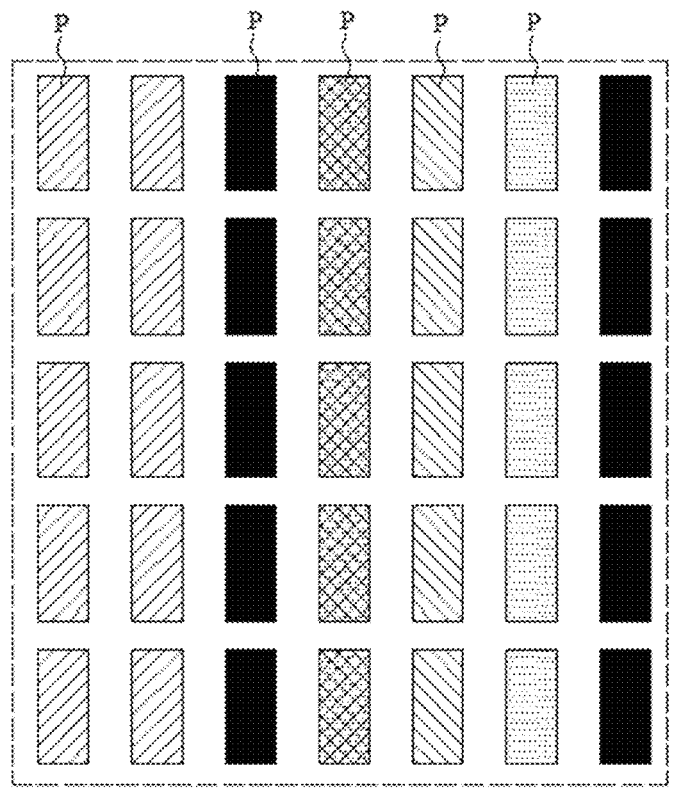
FIG. 3 is a partial schematic diagram of an $m^{th}$ image frame of a liquid crystal display device in a first operating mode according to embodiments of the present disclosure.
Figure 4:
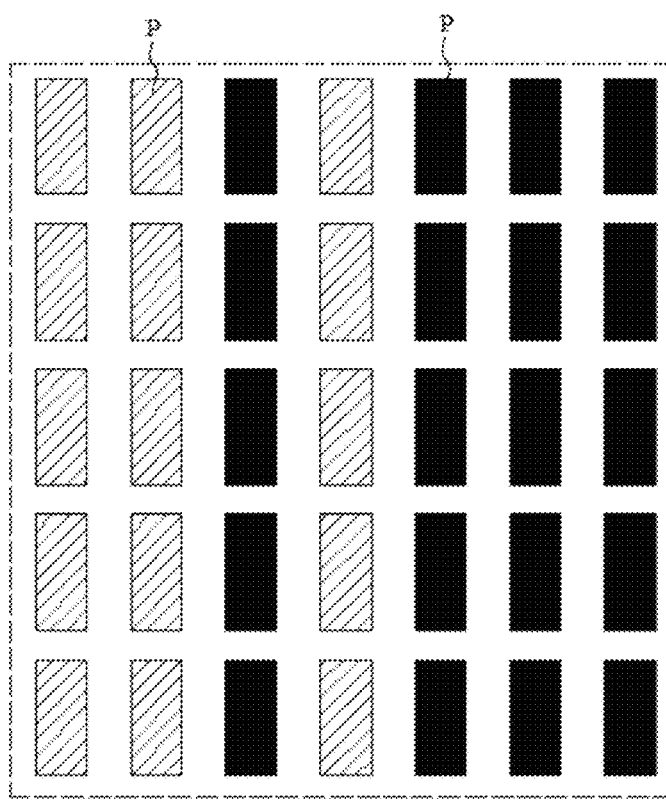
FIGS. 4 to 6 are schematic diagrams of three sub-field images of the $m^{th}$ image frame in FIG. 3.
Figure 5:
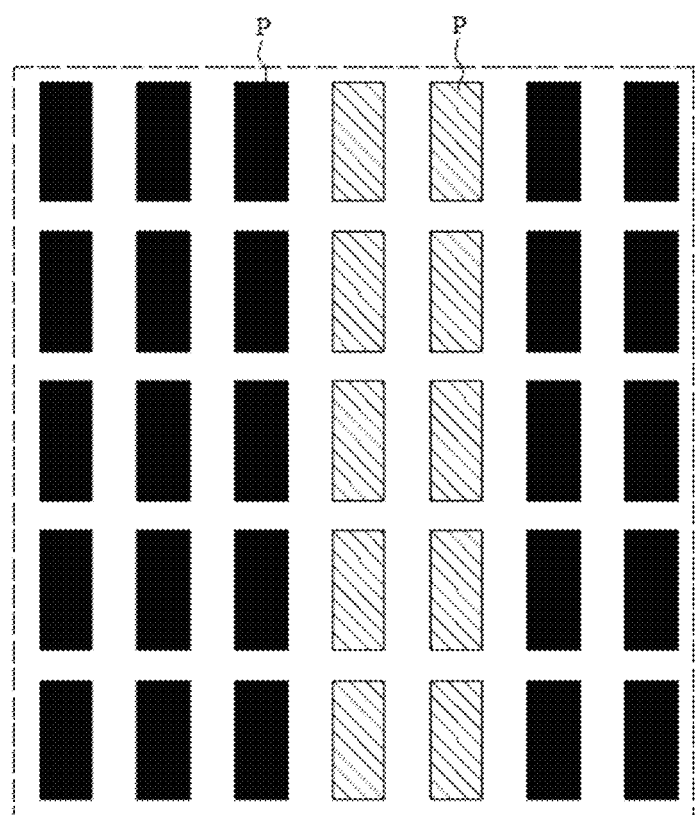
Figure 6:
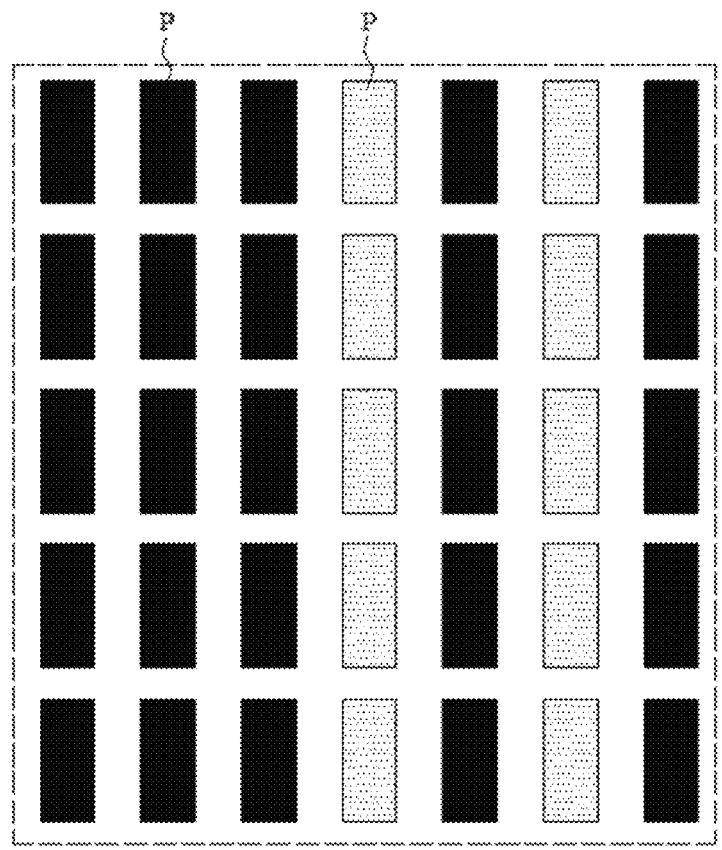

FIGS. 4 to 6 show three sub-field images. In different sub-field images, the light-emitting pixels P form multiple stripe patterns, and in different sub-field images, the light-emitting pixels can differ or overlap. That is, the same pixel can emit light in each sub-field image. The three sub-field images can form the $m^{th}$ image frame shown in FIG. 3. It should be noted that FIG. 3 is only used to illustrate the visual effect formed through color mixing of the three sub-field images, rather than an actual sub-field image.

In some embodiments, the backlight module BLU can include three types of light-emitting devices that can respectively emit red, green, and blue light. One image frame can be divided into three sub-field images, with tones of the three sub-field images being red, green, and blue. The three sub-field images are displayed in sequence, forming one image frame in terms of a visual effect.

As shown in FIG. 2, the control circuit CU can be connected to the array substrate TB and the backlight module BLU, to control the light emitting of the backlight module BLU and the deflection degree of the liquid crystal, that is, to control the color and the gray scale of each pixel. The control circuit CU can include a timing controller, a gate driving circuit, a source driving circuit, a backlight control circuit, etc., configurations of which are not specifically limited here.

It is found that when displaying using the field sequential display method, since one single image frame needs to be displayed through color mixing of multiple sub-field images that are displayed at different times, users may observe red, green, and blue tones simultaneously on the screen when blinking or glancing, or when the objects on the screen are moved, resulting in color breakup.

In order to solve the problem of the color breakup, multiple conditions related to the color breakup are discovered. Based on these conditions, the pixel with the color breakup can be determined as the target pixel, and an average of gray scales of the target pixel and the neighborhood pixels of the target pixel can be used as the gray scale of the target pixel. As a result, the color breakup can be weakened or eliminated by reducing contrast targetedly. Embodiments will be provided in the following for explanation.

First, the basic display principle of the present disclosure will be explained.

As shown in FIGS. 2 to 6, the control circuit CU can include a first operation mode. In the first operation mode, the control circuit CU is configured to control the liquid crystal display device to display n sub-field images in sequence when receiving the display data of the $m^{th}$ image frame, to obtain the $m^{th}$ image frame. The display data includes the initial gray scale of each pixel, considering under n base colors. The tone of one sub-field image is one base color, and the tones of different sub-field images are different. In some embodiments, m and n are positive integers, and n≥2.

The display data can be the initial data received by the control circuit CU for image display. For example, for electronic devices such as televisions or mobile phones, the control circuit CU can be connected to the motherboard of the electronic device, and the display data can be the data output from the motherboard to the control circuit CU. Meanwhile, the display data can include the information required for displaying the $m^{th}$ image frame, which can include the initial gray scale of each pixel under n different base colors. That is, each pixel has n initial gray scales. The initial gray scales of each pixel under the same base color can be transmitted through the same channel, and the initial gray scales under different base colors can be transmitted through different channels. That is, any pixel in the $m^{th}$ image frame can include gray scale information about multiple channels, i.e., the initial gray scale under each base color.

In some embodiments, n can be 3, and the base color can include red, green, and blue. The display data of the $m^{th}$ image frame includes the initial gray scale of each pixel in red, green, and blue. The initial gray scale can be any gray scale from 0 to 255. The $m^{th}$ image frame can be formed by mixing the red sub-field image, the green sub-field image, and the blue sub-field image displayed in sequence.

It should be noted that the larger the gray scale of one pixel under one base color is, the higher the transmittance of the liquid crystal is, the more the light passes through, and the higher the brightness of the pixel under this base color is. As for the pixel above, the proportion of this base color is higher. The smaller the gray scale is, the lower the brightness of the pixel under this base color is, and as for the pixel above, the proportion of this base color is lower.

Second, the scheme of reducing the color breakup will be explained.

Figure 8:
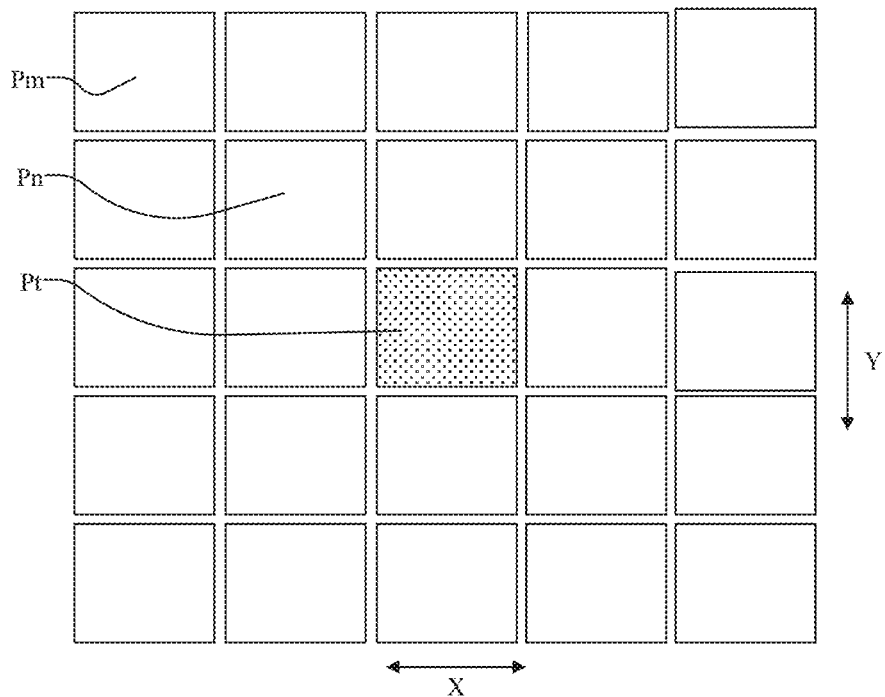
FIG. 8 is a partial enlarged schematic diagram of a liquid crystal display device according to embodiments of the present disclosure.
Figure 9:
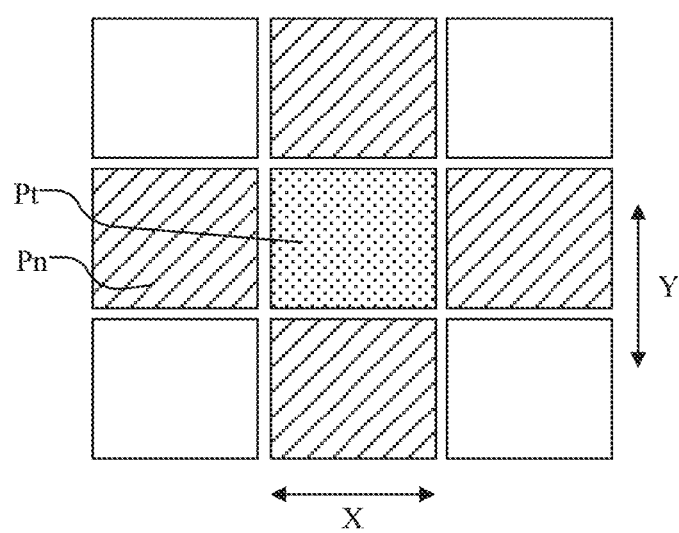
FIG. 9 is a schematic diagram of distribution of target pixels and neighborhood pixels in a liquid crystal display device according to embodiments of the present disclosure.
Figure 10:
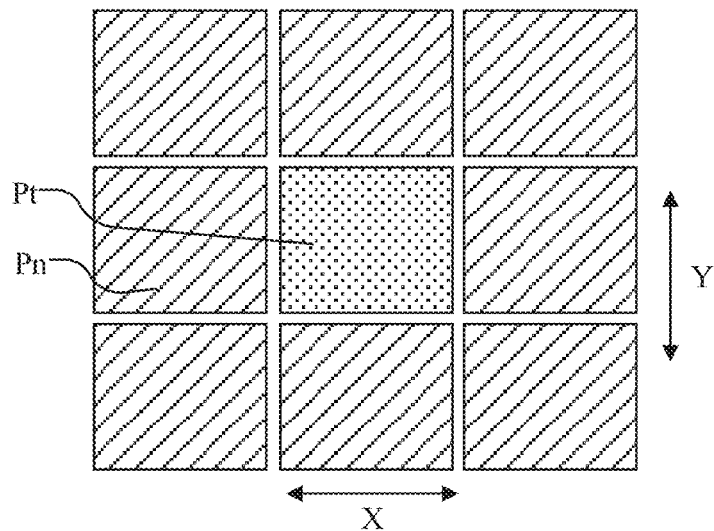
FIG. 10 is a schematic diagram of distribution of target pixels and neighborhood pixels in a liquid crystal display device according to embodiments of the present disclosure.

In any sub-field image of the $m^{th}$ image frame, as shown in FIGS. 8 to 10, in the liquid crystal display device, a pixel that meets at least one of a first condition and a second condition can be selected based on the initial gray scale of each pixel under each base color, as a target pixel Pt. A pixel other than the target pixel Pt can be used as a non-target pixel, and a pixel adjacent to the target pixel Pt among non-target pixels can be used as a neighborhood pixel Pn of the target pixel. In addition, non-target pixels located outside the neighborhood pixel Pn are non-neighborhood pixels Pm. That is, if the color breakup can occur, the pixels can be divided into two categories, namely target pixel(s) Pt and non-target pixels. The non-target pixels can be divided into two categories, namely neighborhood pixels Pn and non-neighborhood pixels Pm. It can also be understood that the pixels can be divided into three categories, namely the target pixel(s) Pt, the neighborhood pixels Pn, and the non-neighborhood pixels Pm. In some embodiments, if no color breakup can occur, which means that all pixels meet neither the first condition nor the second condition, the pixels would not be divided into target pixel(s) Pt, neighborhood pixels Pn, and non-neighborhood pixels Pm.

In some embodiments of the present disclosure, the pixels can be arranged in an array along the first direction X and the second direction Y, in multiple rows and multiple columns, and any pixel can be arranged adjacent to 8 other pixels. Among these 8 pixels, 2 pixels are adjacent to the pixel at the center in the first direction X, and 2 pixels are adjacent to the pixel at the center in the second direction Y.

In some embodiments, pixels can also be arranged in other ways, but for any pixel, there are other pixels adjacent to it.

The first condition and the second condition will be explained in detail in the following.

The first condition mentioned above is that in a target color gamut in a reference color space, a distance between a target point that reflects a color of a target pixel and a white point is less than a distance threshold.

Based on the initial gray scale of each pixel in the $m^{th}$ frame, the color of each pixel can be determined. A point in the target color gamut in the reference color space can be used to represent the color of any pixel in the $m^{th}$ image frame. The target color gamut can be the BT.2020 color gamut, and in some embodiments, other color gamuts such as BT.709 and DCI-P3 can also be used, which will be not specially limited here. The target color gamut also includes a white point. There is a certain distance between the point that reflects a non-white pixel and the white point. Points representing each base color are included within the boundary of the target color gamut. In some embodiments, a distance between a point P and a white point W in the target color gamut can satisfy the following formula:

$$dis = \sqrt{(P.x - W.x)^2 + (P.y - W.y)^2};$$

where dis represents the distance between the point P and the white point W, (P.x, P.y) represents a coordinate of the point P in the reference color space, and (W.x, W.y) represents a coordinate of the point W in the reference color space.

A distance threshold can be set. For any pixel, if the distance between the point that reflects the color of this pixel and the white point is less than the distance threshold, it indicates that the point is relatively close to the white point. The color of the point is formed by mixing different base colors, and thus the closer the point is located to the white point, the closer the proportions of the base colors are, resulting in more difficult to distinguish (visually) and more likely to cause the color breakup. Therefore, the pixel corresponding to such point can be used as the target pixel.

The display data contains the initial gray scale of each pixel under each base color. After the initial gray scale of any pixel in the $m^{th}$ image frame is normalized and gamma transformed, a stimulus value for the pixel can be obtained. For example, the initial gray scale of a pixel under three base colors is (R, G, B), and a tri-stimulus value after normalization and gamma transformation is $((R/255)^{gamma}, (G/255)^{gamma}, (B/255)^{gamma})$, where 255 is the maximum gray scale of a pixel. In some embodiments, 255 can also be replaced with other values, depending on the specific performance of the liquid crystal display device. The value of gamma can be 2.2, or 1, 3.3, etc.

The color coordinate of the color displayed by each pixel can be determined based on the tri-stimulus value. In some embodiments, the display data of the $m^{th}$ image frame can be first converted from an original color space to a reference color space through transformation mapping. In some embodiments, the tri-stimulus value in the original color space, which is determined based on the initial gray scale of any pixel in the display data, can be converted into a tri-stimulus value in the reference color space, i.e., a reference tri-stimulus value. The original color space can be the RGB color space, and the reference color space can be the XYZ color space. Within the reference color space, the tri-stimulus value for a pixel with respect to the color to be displayed under each base color is determined, i.e., a target tri-stimulus value. The target tri-stimulus value is then converted back to the original color space based on an inverse mapping of an actual mapping corresponding to an actual color gamut of the liquid crystal display device, and the gray scale of each pixel under each base color is determined based on the target tri-stimulus value. The pixels of the liquid crystal display panel PNL are controlled based on the determined gray scale, and multiple sub-field images are displayed. The detailed process can be found in the explanation of the relevant steps of the method for displaying an image in the following.

In the above embodiments, the display data is converted from the original color space to the reference color space using transformation mapping, and then converted back to the original color space through the inverse mapping of the actual mapping. The main reason for such processing is that in the RGB color space, the color coordinate and the tri-stimulus value may be negative, and calculating directly using the negative values may lead to incorrect results and affect the calculation of the color coordinate and the tri-stimulus value. Therefore, by converting the display data into the XYZ color space, the reference tri-stimulus value obtained is positive and is easy for calculation. However, when displaying images in practice, the liquid crystal display device requires the gray scale in the RGB color space. Therefore, the reference tri-stimulus value can be mapped back to the RGB color space for display by the liquid crystal display device.

The actual mapping mentioned above can be a matrix predetermined based on the actual color gamut of the liquid crystal display device, the actual mapping can be used to convert the tri-stimulus value of any point in the actual color gamut from the original color space to the reference color space, and the inverse mapping of the actual mapping can be used to convert the tri-stimulus value of any point in the actual color gamut from the reference color space to the original color space. The actual color gamut can be determined through image detection and other methods before the liquid crystal display device leaves the factory. The actual color gamut of different liquid crystal display devices may be different, and the actual mapping may also be different correspondingly.

Based on the above explanation, in some embodiments of the present disclosure, for any liquid crystal display device, multiple reference points can be determined within the boundary of the target color gamut, the reference points are points other than the points that reflect the base color, and any reference point is located at a certain distance from the white point. The distance threshold mentioned above satisfies the following constraints:

$$1.4 Dmax \geq \text{distance threshold} \geq Dmax;$$

and

Dmax is the maximum distance among distances between the reference points and the white point.

In some embodiments, 1.3 Dmax≥distance threshold≥Dmax. In some embodiments, the distance threshold can also adopt directly 1.4 Dmax, 1.3 Dmax, or Dmax. In some embodiments, the number of reference points can be three, and the three reference points respectively represent magenta, yellow, and cyan in the target color gamut in the reference color space. The magenta is a mixture of red and blue, the yellow is a mixture of red and green, and the cyan is a mixture of blue and green. Due to the fact that the actual color gamut of different liquid crystal display devices may be different, for different liquid crystal display devices, the distances between the same reference point representing the same color and the white point may be different. Therefore, the point having the largest distance from the white point can be selected as the reference point, and the distance between this point and the white point can be used as Dmax.

The second condition mentioned above can include two sub-conditions, namely a first sub-condition and a second sub-condition. As long as at least one of the two sub-conditions is met, the second condition is considered to be met.

The first sub-condition is that the reference brightness of the target pixel, which is determined based on the initial gray scales of the target pixel under n base colors, is greater than a brightness threshold.

The target pixel has an initial gray scale under each base color. That is, the target pixel has n initial gray scales. In order to facilitate comparison, the reference brightness can be calculated based on the initial gray scales. The larger the reference brightness is, the easier the color breakup is to be observed. Based on optical detection methods and empirical data, a brightness threshold can be set. When the reference brightness exceeds the brightness threshold, it can be determined that the first sub-condition is met and the color breakup occurs.

In some embodiments, the brightness threshold can meet the following requirements:

$$60 \geq \text{brightness threshold} \geq 20.$$

In some embodiments of the present disclosure, n=3, which means there are three base colors, and the three base colors are red, green, and blue, respectively. The target pixel can be greyed to obtain the reference brightness. The reference brightness and the initial gray scale satisfy the following relationship:

$$\text{gray} = k1 \times R + k2 \times G + k3 \times B;$$

$$\text{and } k1 < k3 < k2;$$

where gray represents the reference brightness of the target pixel; R is the initial gray of the target pixel under red, that is, the initial gray in the red channel; G is the initial gray scale of the target pixel under green, that is, the initial gray scale in the green channel; B is the initial gray scale of the target pixel under blue, that is, the initial gray scale in the blue channel; and k1, k3, and k2 are constants.

Due to the fact that the perception level of red, green, and blue by the human eye is not the same, for example, in the order of green>blue>red, the weight of red, green, and blue in the reference brightness can be reflected through k1<k3<k2. The weight corresponds to the perception level, and the green with the highest perception level has the highest weight, thus matching the perception level of the human eye. In some embodiments, based on optical detection and other methods, k1 can be determined as 0.114, k2 can be determined as 0.587, and k3 can be determined as 0.2989.

In some embodiments of the present disclosure, the reference brightness can also be determined as an average of the three initial gray scales, that is, the reference brightness can satisfy the following relationship:

$$\text{gray} = (R + G + B)/3;$$

where gray represents the reference brightness of the target pixel, R is the initial gray of the target pixel under red, G is the initial gray of the target pixel under green, and B is the initial gray of the target pixel under blue.

In some embodiments of the present disclosure, the greying of the target pixel can also be achieved through other means to obtain the reference brightness. For example, the reference brightness can be represented through the maximum or minimum value of the initial gray scale of the target pixel. For example, the initial gray scale of one of the base colors can also be used as the reference brightness.

The above embodiments for achieving the greying of the target pixel, which calculates the reference brightness of the target pixel, can be used for any pixel. By using the above embodiments, the reference brightness of the neighborhood pixel of the target pixel can be obtained, and the reference brightness of the non-neighborhood pixel can also be obtained.

The second sub-condition is that the contrast of the target pixel, which is determined based on the reference brightness of the target pixel and the reference brightness of H neighborhood pixel(s) adjacent to the target pixel, is greater than a contrast threshold, and H≥1.

Based on the reference brightness of the target pixel, which is determined according to the first sub-condition above, as well as H neighborhood pixels of the target pixel, the contrast of the target pixel can be calculated, where H is greater than 1. The larger the contrast is, the greater the difference between the reference brightness of the target pixel and the reference brightness of neighborhood pixels is, and the more obvious the color breakup exhibits. Therefore, a contrast threshold can be set based on optical detection methods and empirical data. When the contrast is greater than the contrast threshold, it is determined that the second sub-condition is met and the color breakup occurs.

When calculating the contrast of the target pixel, some or all neighborhood pixels can be selected for calculation. In some embodiments, as shown in FIG. 8, the pixels are arranged in an array along the first direction X and the second direction Y. For one target pixel, the number H of neighborhood pixels used to calculate the contrast is less than or equal to 8 (H≤8). When selecting the neighborhood pixels for use in the contrast calculation, if 2 neighborhood pixels are selected, the 2 neighborhood pixels adjacent to the target pixel in the first direction X or the second direction Y can be selected. As shown in FIG. 9, if 4 neighborhood pixels are selected, the 4 neighborhood pixels adjacent to the target pixel in the first direction X and the second direction Y can be selected. If 6 neighborhood pixels are selected, 4 neighborhood pixels adjacent to the target pixel in the first direction X and the second direction Y, as well as 2 other neighborhood pixels diagonally distributed about the target pixel, can be selected. The method of selecting the neighborhood pixels is not specially limited in the present disclosure.

In some embodiments of the present disclosure, the contrast threshold can meet the following requirements: 900≥contrast threshold≥225.

In some embodiments of the present disclosure, as shown in FIGS. 9 and 10, one target pixel has 8 neighborhood pixels, and H is 4. That is, 4 neighborhood pixels are selected to calculate the contrast, and the 4 neighborhood pixels are adjacent to the target pixel in the first direction X and the second direction Y, evenly distributed around the target pixel. The contrast of the target pixel satisfies the following formula:

$$C = \frac{1}{4} \times \sum_{\Delta j=-1,1} (\text{gray}(i,j) - \text{gray}(i, j+\Delta j))^2 +$$

$$\frac{1}{4} \times \sum_{\Delta i=-1,1} (\text{gray}(i,j) - \text{gray}(i+\Delta i, j))^2;$$

where C represents the contrast of the target pixel, gray (i, j) represents the reference brightness of the target pixel, gray (i, j+Δj) represents the reference brightness of a neighborhood pixel adjacent to the target pixel in the first direction X, gray (i+Δi, j) represents the reference brightness of a neighborhood pixel adjacent to the target pixel in the second direction Y.

Figure 11:
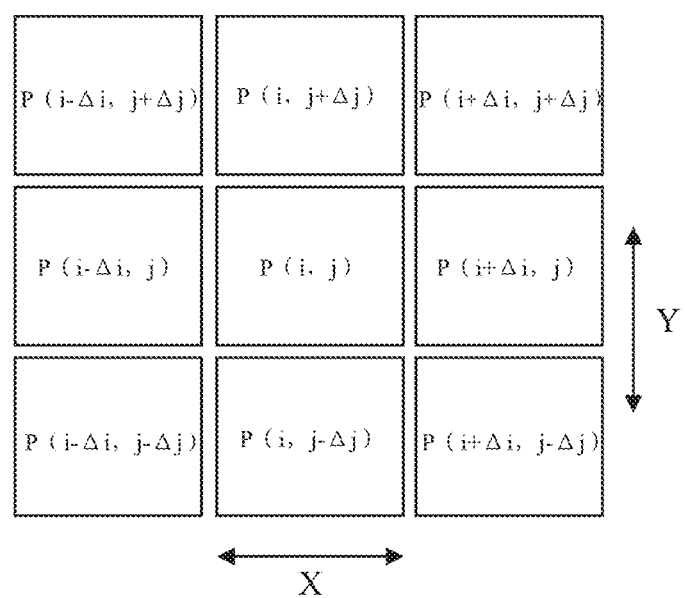
FIG. 11 is a schematic diagram of coordinates of target pixels and neighborhood pixels in a liquid crystal display device according to embodiments of the present disclosure.

In some embodiments of the present disclosure, as shown in FIGS. 10 and 11, one target pixel has 8 neighborhood pixels, and His 8. That is, 8 neighborhood pixels are selected to calculate the contrast. The contrast of the target pixel satisfies the following formula:

$$C = \frac{1}{8} \times \sum_{\Delta j=-1,1} (\text{gray}(i,j) - \text{gray}(i, j+\Delta j))^2 +$$

$$\frac{1}{8} \times \sum_{\Delta i=-1,1} (\text{gray}(i,j) - \text{gray}(i+\Delta i, j))^2 +$$

$$\frac{1}{8} \times \sum_{\Delta i=-1,1} (\text{gray}(i,j) - \text{gray}(i+\Delta i, j+\Delta j))^2;$$

where C represents the contrast of the target pixel, gray (i, j) represents the reference brightness of the target pixel, gray (i, j+Δj) represents the reference brightness of a neighborhood pixel adjacent to the target pixel in the first direction X, gray (i+Δi, j) represents the reference brightness of a neighborhood pixel adjacent to the target pixel in the second direction Y, gray (i+Δi, j+Δj) represents the reference brightness of a neighborhood pixel adjacent to the target pixel in the first direction X and the second direction Y.

Figure 12:
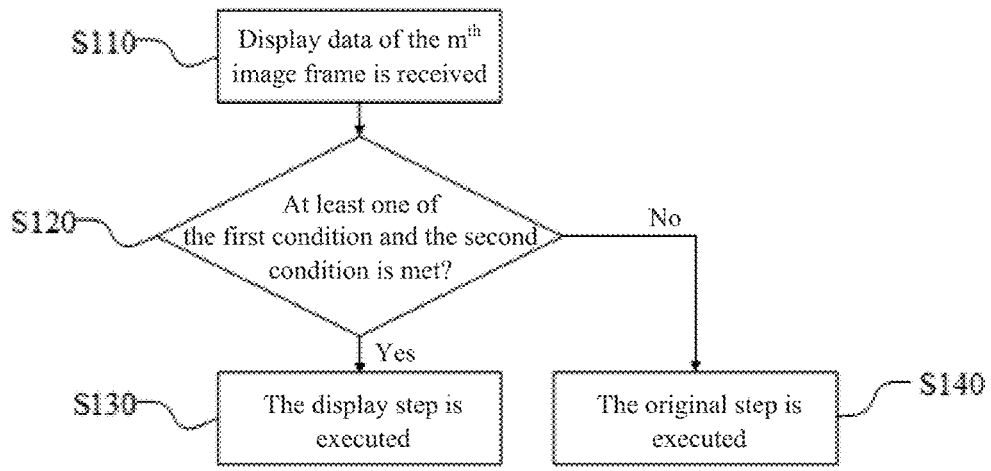
FIG. 12 is a flowchart of a method for displaying an image according to embodiments of the present disclosure.

As shown in FIG. 12, that the color breakup occurs can be determined as long as at least one of the first condition, the first sub-condition and the second sub-condition of the second condition mentioned above is met.

Figure 13:
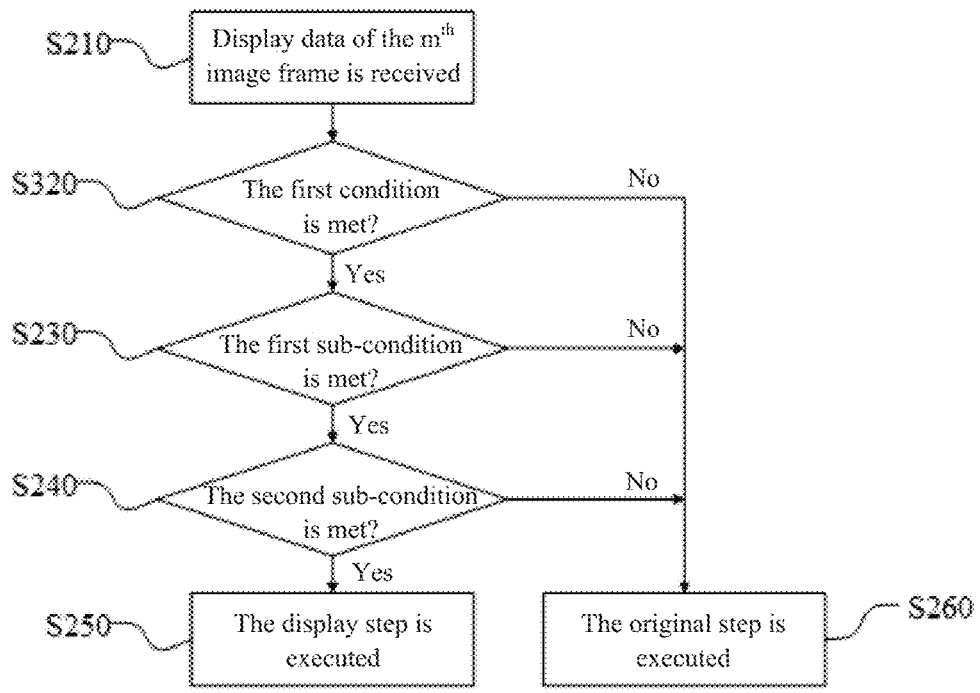
FIG. 13 is a flowchart of a method for displaying an image according to embodiments of the present disclosure.

In some embodiments of the present disclosure, as shown in FIG. 13, it is possible to perform rough screening by determining first whether the first condition is met. If the first condition is met, the first fine screening is performed by determining whether the first sub-condition is met. If the first sub-condition is met, the second fine screening can be performed by determining whether the second sub-condition is met. If the first condition, the first sub-condition, and the second sub-condition are met sequentially, it can be determined that the color breakup occurs and the target pixel and its neighborhood pixels can be determined. According to embodiments of the present disclosure, the target pixel can be selected through three screening based on different criteria (the distance, the gray scale, and the contrast), which can achieve high accuracy, and prevent the pixels that have not undergone the color breakup from being determined as the target pixel.

In some embodiments of the present disclosure, there can also be a case where the second condition is met while the first condition is not met. Alternatively, there can also be a case where only the first condition is met while the second condition is not met.

In some embodiments, it is possible to determine based on only one of the first and second conditions, without determining based on all conditions. In some embodiments, when the first condition is met, it is determined that the color breakup occurs, without determining whether the second condition is met. In some embodiments, it is possible to directly determine whether the second condition is met without determining whether the first condition is met, and as long as the second condition is met, it is considered that the color breakup occurs. In some embodiments, when determining based on the first and second sub-conditions, it is also possible to determine based on only one of them.

Based on the two conditions mentioned above, pixels other than the target pixel screened can be used as non-target pixels. The non-target pixels include neighborhood pixels and non-neighborhood pixels. The neighborhood pixels refer to non-target pixels that are adjacent to the target pixel, and the non-neighborhood pixels are pixels other than the neighborhood pixels. The target pixel can be taken as the center, and the filtering operation can be performed. The filtering operation determines the actual gray scale based on the initial gray scale, so as to weaken or eliminate the color breakup, which will be explained in detail in the following.

In any sub-field image, an average of an intermediate gray scale of the target pixel and the initial gray scale(s) of T non-target pixel(s) can be determined as the actual gray of the target pixel, the intermediate gray scale of the target pixel herein being determined based on the initial gray scale of the target pixel, and the actual gray scales of at least some of the non-target pixels are their initial gray scales. The target pixel and T non-target pixel(s) are located within the first filtering template, with T≥1. In some embodiments, T non-target pixels are all neighborhood pixels. In some embodiments, T>1, and T non-target pixels include at least some neighborhood pixels and some non-neighborhood pixels.

The first filtering template is used to represent a certain area or range, and the size of the first filtering template can be represented by the number of pixels arranged consecutively along the first direction X and the second direction Y. In some embodiments, the size of the first filtering template can be represented by $Z_1 \times Z_1$ pixels. That is, $Z_1$ pixels arranged consecutively along the first direction X and $Z_1$ pixels arranged consecutively along the second direction Y. $Z_1$ is an integer greater than 2, for example, $Z_1$ is 3, and the first filtering template includes 3×3 pixels. T pixels can be a part or all of pixels selected from the $Z_1 \times Z_1$ pixels.

In some embodiments, the first filtering template includes the target pixel, which can be located at the center of the first filtering template, so as to select pixels around the target pixel uniformly. The neighborhood pixels in T pixels can be evenly distributed around the target pixel. $Z_1$ can be odd, for example, 3, 5, etc., ensuring that the target pixel is at the center.

In some embodiments of the present disclosure, the intermediate gray scale is an average of the initial gray scale of the target pixel and the initial gray scale(s) of U non-target pixel(s), where U≥1. The target pixel and the U non-target pixel(s) are located within the second filtering template. In some embodiments, the U non-target pixels are all neighborhood pixels. In some embodiments, U>1, and the U non-target pixels include at least some neighborhood pixels and some non-neighborhood pixels. U can be equal to T or not equal to T.

The meaning of the second filtering template can be the same as that of the first filtering template, and it can also be used to represent a certain area and range. The size of the second filtering template can also be represented by $Z_1 \times Z_1$ pixels, but the size of the second filtering template may not be the same as that of the first filtering template. The size of the second filtering template can also be less than or equal to that of the first filtering template. For example, the second filtering template includes 3×3 pixels, and the first filtering template also includes 3×3 pixels. Alternatively, the second filtering template includes 5×5 pixels, and the first filtering template includes 3×3 pixels. Alternatively, the second filtering template includes 3×3 pixels, and the first filtering template includes 5×5 pixels.

In some embodiments, the second filtering template can be used first to filter out the target pixel and multiple non-target pixels, and the average of the initial gray scale of the target pixel and the initial gray scales of U non-target pixels can be calculated to obtain the intermediate gray scale. That is, the first round of filtering operation is performed on the target pixel. The first filtering template is then used to filter out the target pixel and multiple non-target pixels, and the average of the intermediate gray scale and the initial gray scales of T non-target pixels is calculated to obtain the actual gray scale of the target pixel. That is, the second round of filtering operation is performed.

In some embodiments of the present disclosure, the intermediate gray scale is the initial gray scale of the target pixel, and the actual gray scale of the target pixel is the average of the initial gray scale of the target pixel and the initial gray scales of T non-target pixels. As a result, the target pixel and multiple non-target pixels can be filtered out by using the first filtering template only, and the average of the intermediate gray scale and the initial gray scales of T non-target pixels is calculated, so as to obtain the actual gray scale of the target pixel. Therefore, the average calculation can be performed only once instead of twice.

According to the above embodiments of the present disclosure, when the liquid crystal display device displays any sub-field image, the sub-field image displayed is a single tone image. For a target pixel, the gray scale used is not an initial gray scale of the target pixel, but an average value. In this way, the contrast of the target pixel relative to the surrounding pixels of the target pixel can be reduced, thereby weakening or eliminating the color breakup.

Each pixel has the initial gray scale under each base color, and if there are three base colors, each pixel would have three initial gray scales. When calculating the actual gray scale, it can be calculated separately under each base color to obtain the actual gray scale of the target pixel under each base color. For example, the actual gray scale of a target pixel under the base color red is the average of the intermediate gray scale of the target pixel under red and the initial gray scales of T non-target pixels, the actual gray scale under the base color green is the average of the intermediate gray scale of the target pixel under green and the initial gray scales of T neighborhood pixels, and the actual gray scale under the base color blue is the average of the intermediate gray scale of the target pixel under blue and the initial gray scales of T pixels.

In some embodiments, as shown in FIGS. 9 and 10, the neighborhood pixels of the target pixel are 8 pixels, and T can be 4, 8, etc., but T pixels may not all be neighborhood pixels. For example, if the first filtering template includes 5×5 pixels, then T can include some neighborhood pixels and some non-neighborhood pixels, which is not specially limited here. To ensure uniformity, T non-target pixels can be evenly distributed around the target pixel. For example, a target pixel has 8 neighborhood pixels, and T is 4, which means 4 neighborhood pixels are selected to calculate the average, and the 4 neighborhood pixels are the 4 neighborhood pixels that are adjacent to the target pixel in the first direction X and the second direction Y. Alternatively, T is 8, and all 8 neighborhood pixels are used to calculate the average.

When calculating the actual gray scale of the target pixel under any base color, the following formula can be used.

$$\text{mean}(i, j) = \frac{1}{Z_1^2} \times \sum_{s=-\frac{Z_1}{2}}^{\frac{Z_1}{2}} \sum_{k=-\frac{Z_1}{2}}^{\frac{Z_1}{2}} \text{input}(i+s, j+k);$$

where mean (i, j) represents the actual gray scale, $Z_1$ represents the number of pixels of the first filtering template that is centered at the target pixel in the first direction X and second direction Y, and input (its, j+k) represents the initial gray scale of the pixel used to calculate the actual gray scale of the target pixel.

The above formula can be used when calculating the actual gray scale of the target pixel under each base color.

In some embodiments of the present disclosure, the filtering operation can be performed on non-target pixels around the target pixel, so as to further reduce the contrast, improve the color breakup, and enhance the smoothness of the image. The distance between the non-target pixel and the target pixel, on which the filtering operation is performed, can be within a certain range. For example, the non-target pixel and the target pixel are separated by a maximum of 2-3 pixels. In this way, the non-target pixel on which the filtering operation is performed can be neighborhood pixels of the target pixel or non-neighborhood pixels within a certain range.

As shown in FIGS. 8 to 10, in some embodiments of the present disclosure, in any sub-field image of the $m^{th}$ image frame:

at least one non-target pixel exists, the actual gray scale of the at least one non-target pixel is an average of the initial gray scales of W non-target pixels including this at least one non-target pixel and the actual gray scale of the target pixel, and the W non-target pixels and the target pixel are located within the third filtering template, where W≥2.

In some embodiments, the non-target pixels on which the filtering operation is performed can be neighborhood pixels. The filtering operation can be performed simultaneously for some or all neighborhood pixels, depending on the value of W. The size of the third filtering template for performing the filtering operation on each neighborhood pixel is the same. For example, all third filtering templates used can have 3×3 pixels. In some embodiments, the filtering operation can also be performed on non-neighborhood pixels.

The meaning of the third filtering template can be the same as the first filtering template and the second filtering template, and the size of the third filtering template can also be represented by $Z_1 \times Z_1$ pixels. The size of the third filtering template can be the same as that of the first filtering template, for example, both include 3×3 or 5×5 pixels. In this way, the filtering operation performed on the non-target pixels and the filtering operation performed on the target pixel based on the first filtering template can be carried out simultaneously, using the filtering templates of the same size. Therefore, there is no need to identify and filter out the target pixel when performing the filtering operation on the non-target pixels, which is conducive to improving the operational efficiency. When the first filtering operation is performed on the non-target pixels, the second filtering operation is performed on the target pixel, both of which belong to the second round of filtering operation, which can further reduce the contrast between the target pixel and the surrounding area, and weaken the color breakup. Based on the aforementioned scheme, the number of filtering operations performed on the target pixel is one more than the number of filtering operations performed on the non-target pixels.

In some embodiments, in a sub-field image of the $m^{th}$ image frame, the filtering operation mentioned above can be performed on more non-target pixels. That is, a third or more rounds of filtering operations can be carried out. The specific means through which the filtering operations is carried out include, likewise, taking a non-neighborhood pixel as the center, and calculating the average of gray scales of the pixels within the filtering template. If the filtering template includes the target pixel and the non-target pixels on which the second round of filtering operation is performed, the gray scales used for calculating the average can adopt the actual gray scale of the target pixel and the actual gray scales of the non-target pixels on which the second round of filtering operation is performed. The gray scales of the non-target pixels that have not undergone filtering operations adopt the initial gray scales. As a result, the peripheral image of the target pixel can be further smoothed, the contrast can be reduced, and the color breakup can be improved. In some embodiments, the filtering template can include neither the target pixel nor the non-target pixels on which the second round of filtering operation is performed.

In some embodiments, each round of filtering operation includes performing the filtering operation on pixels on which the filtering operation has been performed previously, to avoid specifically excluding the pixel on which the filtering operation has been performed.

In some embodiments, the third filtering template can include the target pixel, but the target pixel is not located at the center of the third filtering template. The third filtering template is centered around a non-target pixel, so as to evenly select pixels around this non-target pixel.

In the W pixels, the pixels except for the non-target pixel located at the center, and the target pixel can be evenly distributed around the non-target pixel located at the center. $Z_1$ can be odd, for example, 3, 5, etc., ensuring that the non-target pixel is located at the center.

As shown in FIGS. 8 to 10, in some embodiments of the present disclosure, the third filtering template can also not include the target pixel. That is, the target pixel is located outside the third filtering template.

In any sub-field image of the $m^{th}$ image frame:

the actual gray scale of at least one non-target pixel is an average of the initial gray scales of W non-target pixels including this at least one non-target pixel, and the W non-target pixels are located within the third filtering template, where W≥2. The size of the third filtering template and the size of the second filtering template are the same.

In some embodiments, the non-target pixels on which the filtering operation is performed can be non-neighborhood pixels. When performing the filtering operation on the non-target pixels, i.e., when calculating the average, neither the initial gray scale of the target pixel nor the actual gray scale of the target pixel are used in the calculation. The calculation formula for the average of the gray scale can refer to the calculation of the actual gray scale of the target pixel under any base color mentioned above, which will not be repeated here.

In some embodiments of the present disclosure, the control circuit CU further includes a second operation mode. In the second operation mode, the control circuit CU is configured to control, in response to receiving the display data of the $m^{th}$ image frame, the liquid crystal display device to display n sub-field images in sequence, to obtain the $m^{th}$ image frame, where m and n are positive integers, and n is greater than or equal to 2. The actual gray scale of each pixel is the initial gray scale thereof.

In the second operation mode, the display is achieved directly based on the display data, without the need to screen out the target pixel based on the first and second conditions, and without calculating the actual gray scale based on the initial gray scale.

The first operation mode and the second operation mode mentioned above can be activated upon receiving a startup signal. For example, user's eyeball images can be collected through an image acquisition device, and the movement speed of the eyeball can be determined by using an image processing device based on the eyeball images. When the movement speed reaches a speed threshold, the color breakup may be obvious. At this time, the control circuit CU can be configured in the first operation mode to eliminate the color breakup. When the movement speed does not reach the speed threshold, the color breakup may not be obvious. At this time, the control circuit CU can be configured in the second operation mode, thereby improving operational efficiency.

Embodiments of the present disclosure provide an electronic device, which can include a liquid crystal display device. The structure of the liquid crystal display device can be that of the liquid crystal display device described in any of the aforementioned embodiments, which will not be repeated here.

Figure 7:
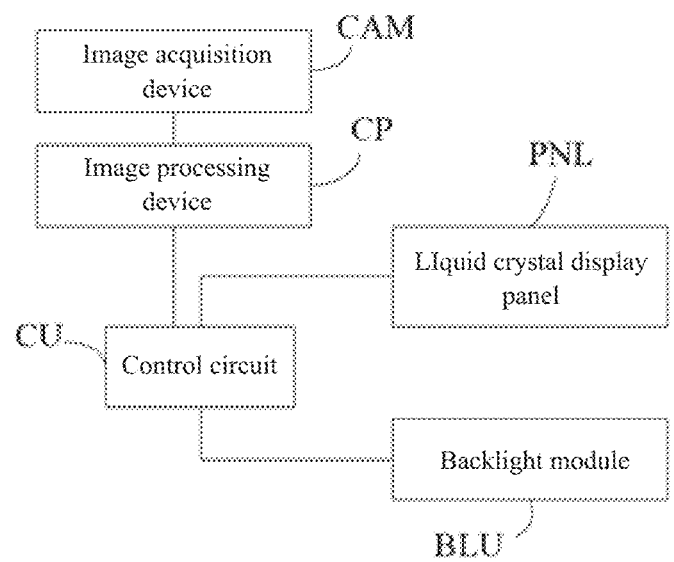
FIG. 7 is a schematic diagram of an electronic device according to embodiments of the present disclosure.

As shown in FIG. 7, the electronic device further includes an image acquisition device and an image processing device.

The image acquisition device CAM can include one or more cameras. Other devices that can obtain image information such as human or object feature information can also be used. The image acquisition device CAM can collect user's eyeball images in real time.

The image processing device CP can be connected to the image acquisition device CAM, and can be used to determine the movement speed of the eyeball based on the eyeball images. When the movement speed reaches the speed threshold, the image processing device CP outputs a startup signal to the control circuit CU, and configure the control circuit CU in the first operation mode. When the movement speed does not reach the speed threshold, no startup signal is output, and the control circuit CU is configured in the second operation mode.

The image processing device CP can recognize the pupil center based on the eyeball images, and determine the movement speed of the eyeball based on the change in the position of the pupil center.

In some embodiments, the electronic device can further include an infrared detection device that can locate the user's corneal center through infrared light. The line connecting the corneal center and the pupil center that is recognized by the image processing device is the optical axis of the visual system, and the true visual line direction can be obtained based on the angle between the optical axis and the visual axis. In some embodiments, the electronic device can further include a thermal mirror, so as to reduce tracking errors without affecting the display of the image, or to transmit infrared light and eye images using the optical waveguide.

In some embodiments, the eyeball tracking can also be achieved through other means, which will be not specially limited here.

The electronic device provided in embodiments of the present disclosure can be mobile phones, televisions, tablets, as well as head mounted display devices such as smart glasses, which will not be listed here.

Regarding the liquid crystal display device and the electronic device disclosed in the present disclosure, whether the relevant product falls within the protection scope of the present disclosure, thereby constituting infringement, can be determined by means of following methods.

1. Whether the relevant product includes a liquid crystal display panel and a control circuit is determined, where the liquid crystal display panel has multiple light-emitting pixels. As long as the relevant product includes multiple light-emitting units that utilize liquid crystals for display, and a circuit for controlling these units, it can be considered as including a liquid crystal display panel and a control circuit.
2. In the startup state, whether the control circuit receives signals from the outside and transmits the signals to the pixels are determined. If the control circuit receives signals from the outside and transmits the signals to the pixels, whether an image frame includes multiple sequentially displayed monochromatic tone images, namely sub-field images, is determined. If the image frame includes multiple sequentially displayed monochromatic tone images, it is determined that the image frame is displayed using the field sequential display method, which is the same as the basic principle for achieving display of the present disclosure. There is no limit to the number of sub-field images in a single image frame.
3. In the startup state, in any sub-field image, in an area with low contrast, whether a pixel, with the gray scale of which being an average of its gray scale and the gray scale(s) of the pixels adjacent to this pixel, exists is determined, based on image detection methods in combination with the method of obtaining signals such as a pixel voltage of the pixel. If such pixel exists, whether the initial gray scale of this pixel meets at least one of the first and second conditions can be determined, based on the data such as the pixel voltage detected. If the initial gray scale of this pixel meets at least one of the first and second conditions, it is determined that the relevant product falls within the protection scope of the present disclosure.

Figure 14:
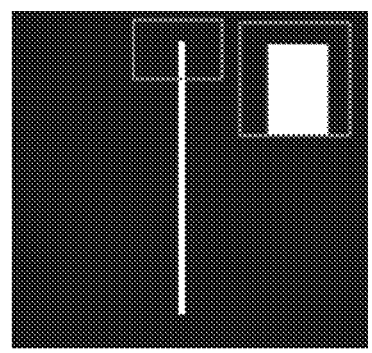
FIG. 14 shows a screen without adopting a scheme of the present disclosure.
Figure 15:
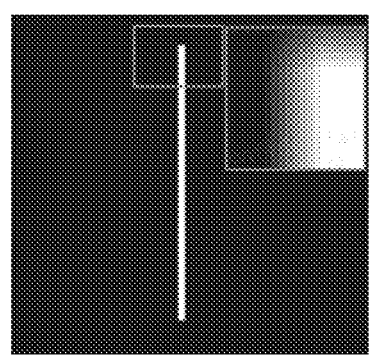
FIG. 15 shows a screen adopting a scheme of the present disclosure.

In some embodiments, regarding the liquid crystal display device disclosed in the present disclosure, tests are conducted and test results are provided, as shown in FIGS. 14 and 15. Each pixel displays an image directly based on the initial gray scale, that is, the actual gray scale is the initial gray scale. The image in FIG. 14 is a white stripe (initial gray scale of R, G, B is (255, 255, 255)).

As shown in FIG. 15, the scheme disclosed by the present disclosure is used, the actual gray scale of an edge of the white stripe will be less than 255, appearing actually as blurred edges and reduced brightness. When the brightness threshold is set to 50, the contrast threshold is set to 625, and both H and T are equal to 8, and after the filtering operation is performed on the target pixel and the neighborhood pixels, which means two rounds of filtering operations have been performed on the target pixel, the actual gray scales of the pixels on the left edge of the white stripe increase sequentially along the direction close to the central axis of the white stripe, namely (0, 0, 0), (28, 28, 28), (57, 57, 57), (85, 85, 85), (113, 113, 113), (142, 142, 142), (170, 170, 170), (198, 198, 198), (227, 227, 227), and (255, 255, 255). The right edge is mirror symmetric to the left edge, which will not be repeated here and is not shown in the figure.

Embodiments of the present disclosure provide a method for displaying an image, which can be applied to a liquid crystal display device. The structure of the liquid crystal display device can refer to any of the above embodiments, and will not be repeated here. As shown in FIG. 12, the method for displaying an image includes steps S110 to S130.

Steps S110 to S130 are executed in the first operation mode.

Step S110: display data of an $m^{th}$ image frame is received. The display data includes the initial gray scale of each pixel under n base colors. The tone of one sub-field image is one base color, and the tones of different sub-field images are different, where m and n are positive integers, and $n \geq 2$.

Step S120: under each of the base colors, a pixel that meets at least one of a first condition and a second condition is selected as a target pixel, and pixels other than the target pixel are selected as non-target pixels. Multiple pixels adjacent to the target pixel in the non-target pixels are neighborhood pixels, and pixels located outside the neighborhood pixels in the non-target pixels are non-neighborhood pixels. The first condition is that in a target color gamut in a reference color space, a distance between a target point that reflects a color of the pixel and a white point is less than a distance threshold. The second condition is that reference brightness of the pixel is greater than a brightness threshold, and/or, contrast of the pixel, which is determined based on the reference brightness of the pixel and reference brightness of H pixel(s) adjacent to the pixel, is greater than a contrast threshold, where $H \geq 1$.

Step S130: a display step is executed under each of the base colors, to obtain the $m^{th}$ image frame. The display step includes:

an average of an intermediate gray scale of the target pixel and the initial gray scales of T non-target pixels within a first filtering template is determined as an actual gray scale of the target pixel, the intermediate gray scale of the target pixel herein being determined based on the initial gray scale of the target pixel, and initial gray scales of at least some of the non-target pixels are determined as actual gray scales thereof, to display a sub-field image of the $m^{th}$ image frame. The tone of one sub-field image is one base color, and the tones of different sub-field images are different, where $T \geq 1$.

Detailed explanations of each step will be provided in the following by means of examples.

In step S110, the display data can be the initial data received by the control circuit CU for image display. For example, for electronic devices such as televisions or mobile phones, the control circuit CU can be connected to the motherboard of the electronic device, and the display data can be the data output from the motherboard to the control circuit CU. Meanwhile, the display data can include the information required for displaying the $m^{th}$ image frame, which can include the initial gray scale of each pixel under n different base colors. That is, each pixel has n initial gray scales. The initial gray scales of each pixel under the same base color can be transmitted through the same channel, and the initial gray scales under different base colors can be transmitted through different channels.

In some embodiments, n can be 3, and the base color can include red, green, and blue. The display data of the $m^{th}$ image frame includes the initial gray scale of each pixel in red, green, and blue. The initial gray scale can be any gray scale from 0 to 255. The $m^{th}$ image frame can be formed by mixing the red sub-field image, the green sub-field image, and the blue sub-field image displayed in sequence.

It should be noted that the larger the gray scale of one pixel under one base color is, the higher the transmittance of the liquid crystal is, the more the light passes through, and the higher the brightness of the pixel under this base color is. As for the pixel above, the proportion of this base color is higher. The smaller the gray scale is, the lower the brightness of the pixel under this base color is, and as for the pixel above, the proportion of this base color is lower.

In step S120, whether there is a pixel that meets at least one of the first and second conditions is determined under each base color. If there is a pixel that meets at least one of the first and second conditions, then such pixel is used as the target pixel. Multiple pixels adjacent to the target pixel can be used as neighborhood pixels, and pixels located outside the neighborhood pixels can be used as non-neighborhood pixels.

The specific explanations of the first and second conditions have been provided in the liquid crystal display device embodiments mentioned above, which will not be repeated here.

Steps S1210 and S1230 can be used for determining whether the first condition is met.

Step S1210: a color coordinate in a target color gamut in the reference color space of a color of each pixel after color mixing is determined based on the initial gray scale of each pixel.

The target color gamut can be the BT.2020 color gamut, and in some embodiments, other color gamuts such as BT.709 and DCI-P3 can also be used, which will be not specially limited here. The target color gamut also includes a white point. There is a certain distance between the point that reflects a non-white pixel and the white point. Points representing each base color are included within the boundary of the target color gamut. Each pixel can be represented by a point in the target color gamut, and pixels of different colors are represented as different points. The target color gamut also includes the white point.

Step S1220: a distance between each point representing each pixel and the white point is calculated.

The distance between a point P that reflects the color of a pixel in the target color gamut and the white point W can satisfy the following formula:

$$dis = \sqrt{(P.x - W.x)^2 + (P.y - W.y)^2};$$

where dis represents the distance between the point P and the white point W, (P.x, P.y) represents a coordinate of the point P in the reference color space, and (W.x, W.y) represents a coordinate of the point W in the reference color space.

Step S1230: the distance between each point that reflects the color of the pixel and the white point is compared with a distance threshold, and that the first condition is met is determined when the distance between each point that reflects the color of the pixel and the white point is less than the distance threshold.

The distance threshold has been explained in the above embodiments and will not be repeated here.

When determining whether the second condition is met, the first sub-condition and the second sub-condition can be determined separately.

When determining whether the first sub-condition is met, the reference brightness of the target pixel can be calculated and compared with a brightness threshold. When the reference brightness is greater than the brightness threshold, it is determined that the first sub-condition is met. The method for calculating the reference brightness has been explained in the above embodiments and will not be repeated here.

When determining whether the second sub-condition is met, steps S1240 and 1250 can be executed.

Step S1240: under any base color, the contrast of the target pixel is determined based on the reference brightness of the target pixel and the reference brightness of H neighborhood pixel(s) adjacent to the target pixel, where H≥1.

The calculation of the contrast can refer to the explanations of the contrast in the liquid crystal display device embodiments mentioned above, and will not be repeated here.

In some embodiments of the present disclosure, one target pixel has 8 neighborhood pixels, and H is 4. That is, 4 neighborhood pixels are selected to calculate the contrast, and the 4 neighborhood pixels are adjacent to the target pixel in the first direction X and the second direction Y, evenly distributed around the target pixel. The contrast of the target pixel satisfies the following formula:

$$C = \frac{1}{4} \times \sum_{\Delta j = -1, 1} (\text{gray}(i, j) - \text{gray}(i, j + \Delta j))^2 + \frac{1}{4} \times \sum_{\Delta i = -1, 1} (\text{gray}(i, j) - \text{gray}(i + \Delta i, j))^2;$$

where C represents the contrast of the target pixel, gray (i, j) represents the reference brightness of the target pixel, gray (i, j+Δj) represents the reference brightness of a neighborhood pixel adjacent to the target pixel in the first direction X, gray (i+Δi, j) represents the reference brightness of a neighborhood pixel adjacent to the target pixel in the second direction Y.

Step S1250: the contrast of the target pixel is compared with a contrast threshold, and that the second sub-condition is met is determined when the contrast of the target pixel is less than the contrast threshold.

In some embodiments of the present disclosure, the contrast threshold can satisfy: 900≥contrast threshold≥225.

In some embodiments of the present disclosure, step S130 can include steps S1310 and S1320.

Step S1310: an average of the initial gray scale of the target pixel and initial gray scales of U non-target pixels is used as the intermediate gray scale. The target pixel and the U non-target pixels are located within the second filtering template, where U≥1.

Step S1320: an average of the intermediate gray scale and initial gray scales of T non-target pixels within the first filtering template is used as the actual gray scale of the target pixel.

In some embodiments of the present disclosure, the intermediate gray scale is the initial gray scale of the target pixel, and the filtering operation on the target pixel is only performed once. When the filtering operation is performed on the non-target pixels, the filtering operation on the target pixel is no longer performed.

In any sub-field image, the average of the intermediate gray scale of the target pixel and the initial gray scales of T non-target pixels can be determined as the actual gray scale of the target pixel, the intermediate gray scale of the target pixel herein being determined based on the initial gray scale of the target pixel. That is, the filtering operation can be performed on the target pixel. The actual gray scales of at least some of the non-target pixels are initial gray scales thereof, where T≥1. Specifically, when a liquid crystal display device displays any sub-field image, a monochromatic image is displayed. For one target pixel, the gray scale used is not its initial gray scale, but an average value, which is the average of the intermediate gray scale of the target pixel and the initial gray scales of T non-target pixels. According to the methods of the present disclosure, the contrast of the target pixel relative to the neighborhood pixels can be reduced, thereby weakening or eliminating the color breakup.

Each pixel has the initial gray scale under each base color, and if there are three base colors, each pixel would have three initial gray scales. When calculating the actual gray scale, it can be calculated separately under each base color to obtain the actual gray scale of the target pixel under each base color. For example, the actual gray scale of a target pixel under the base color red is the average of the intermediate gray scale of the target pixel under red and the initial gray scales of T non-target pixels, the actual gray scale under the base color green is the average of the intermediate gray scale of the target pixel under green and the initial gray scales of T neighborhood pixels, and the actual gray scale under the base color blue is the average of the intermediate gray scale of the target pixel under blue and the initial gray scales of T pixels.

When calculating the actual gray scale of the target pixel under any base color, the following formula can be used.

$$\text{mean}(i, j) = \frac{1}{Z_1^2} \times \sum_{s=-\frac{Z_1}{2}}^{\frac{Z_1}{2}} \sum_{k=-\frac{Z_1}{2}}^{\frac{Z_1}{2}} \text{input}(i+s, j+k);$$

where mean (i, j) represents the actual gray scale, $Z_1$ represents the number of pixels of the first filtering template that is centered at the target pixel in the first direction X and second direction Y, and input (i+s, j+k) represents the initial gray scale of the pixel used to calculate the actual gray scale of the target pixel.

The above formula can be used when calculating the actual gray scale of the target pixel under each base color.

In some embodiments of the present disclosure, non-target pixels surrounding the target pixel can be used as the center, and the filtering operation can be performed again to further reduce the contrast, improve the color breakup, and enhance the smoothness of the image. For specific details, reference can be made to the filtering operation in the liquid crystal display device embodiments mentioned above, which will not be repeated here.

In some embodiments, it is also possible to select non-target pixels along the direction away from the target pixel and perform the filtering operation mentioned above. The specific methods have been explained in detail in the above and will not be repeated here.

As shown in FIG. 12, for the liquid crystal display device disclosed in the present disclosure, if there is no pixel that meets at least one of the first and second conditions, an original step S140 can be performed, where the initial gray scale of each pixel is used as its actual gray scale for display.

Based on the above steps, in some embodiments of the present disclosure, the method for displaying an image can include steps S210 to S260. In step 210, display data can be received. In step S220, whether the first condition is met can be determined. When the first condition is met, step S230 is executed. In step S230, whether the first sub-condition is met is determined. When the first sub-condition is met, step S240 is executed. In step S240, whether the second sub-condition is met is determined. When the second sub-condition is met, the display step is executed. In the display step, the filtering operation is performed. If any of the first condition, the first sub-condition, or the second sub-condition is not met, an original step S260 is executed and the display is achieved based on the initial gray scale. The details of the above steps have been explained in detail in the above embodiments and will not be repeated here.

In some embodiments of the present disclosure, the method for displaying an image can further include following steps.

In the second operation mode:
display data of the $m^{th}$ image frame is received, and the display data includes n different reference base colors, and n sub-field images are displayed in sequence based on the reference base colors to obtain the $m^{th}$ image frame.

The tone of one sub-field image is one reference base color, and the tones of different sub-field images are different, where m and n are positive integers, and n is greater than or equal to 2.

In the second operation mode, the actual gray scale of the pixel is its initial gray scale.

The first operation mode and the second operation mode mentioned above can be activated upon receiving a startup signal. For example, user's eyeball images can be collected through an image acquisition device, and the movement speed of the eyeball can be determined by using an image processing device based on the eyeball images. When the movement speed reaches a speed threshold, the color breakup may be obvious. At this time, the control circuit can be configured in the first operation mode to eliminate the color breakup. When the movement speed does not reach the speed threshold, the color breakup may not be obvious. At this time, the control circuit can be configured in the second operation mode, thereby improving operational efficiency.

It should be noted that although the various steps of the method for displaying an image provided in the present disclosure are described in a specific order in the drawings, this does not require or imply that these steps must be executed in that specific order, or that all illustrated steps must be executed to achieve the desired results. Additionally or alternatively, certain steps can be omitted, multiple steps can be combined into one step for execution, and/or one step can be decomposed into multiple steps for execution.

Embodiments of the present disclosure also provide a computer-readable storage medium on which a computer program is stored, and a method for displaying an image is implemented when the computer program is executed by a processor.

The description of the above embodiments makes it easy for those skilled in the art to understand the present disclosure. The embodiments described herein can be implemented through software or combination of software and necessary hardware. Therefore, the technical solutions of the present disclosure can be embodied in the form of a program product, which can be stored on a non-volatile storage medium (such as CD-ROM, USB, portable hard drive, etc.) or on a network. The program product includes several instructions to enable a computing device (such as a personal computer, a server, a mobile terminal, or a network device, etc.) to execute the method for displaying an image according to the present disclosure.

After considering the specification and practicing of the invention disclosed herein, those skilled in the art will easily come up with other implementation solutions of the present disclosure. The present disclosure aims to cover any variations, uses, or adaptive changes of the present disclosure, which follow the general principles of the present disclosure and include common knowledge or commonly used technical means in the art that are not disclosed in the present disclosure. The specification and embodiments are only considered exemplary, and the true scope and spirit of the present disclosure are defined by appended claims.

What is claimed is:

1. A liquid crystal display device, comprising a liquid crystal display panel and a control circuit, wherein the liquid crystal display panel comprises multiple pixels;
   wherein the control circuit comprises a first operation mode, and in the first operation mode, the control circuit is configured to control, in response to receiving display data of an $m^{th}$ image frame, the liquid crystal display device to display n sub-field images in sequence, to obtain the $m^{th}$ image frame, wherein the display data comprises initial gray scales of each pixel under n base colors, a tone of one sub-field image is one of the base colors, and tones of different sub-field images are different, where m and n are positive integers, and n≥2;
   wherein in any sub-field image of the $m^{th}$ image frame: the pixels comprise a target pixel and non-target pixels, the non-target pixels comprise multiple neighborhood pixels adjacent to the target pixel and non-neighborhood pixels located outside the neighborhood pixels, an actual gray scale of the target pixel is an average of an intermediate gray scale of the target pixel and initial gray scales of T non-target pixels, wherein the intermediate gray scale is determined based on an initial gray scale of the target pixel, the target pixel and the T non-target pixels are located within a first filtering template, and an actual gray scale of the at least a part of the non-target pixels is an initial gray scale thereof, where T≥1; and
   wherein the target pixel meets at least one of a first condition and a second condition,
   the first condition is that in a target color gamut in a reference color space, a distance between a target point that reflects a color of the target pixel and a white point is less than a distance threshold, and
   the second condition is that reference brightness of the target pixel, which is determined based on the initial gray scales of the target pixel under the n base colors, is greater than a brightness threshold, and/or, the second condition is that contrast of the target pixel, which is determined based on the reference brightness of the target pixel and reference brightness of H neighborhood pixels adjacent to the target pixel, is greater than a contrast threshold, where H≥1;
   wherein the distance threshold is greater than or equal to Dmax and less than or equal to 1.4 Dmax, and Dmax is a maximum distance between multiple reference points within a boundary of the target color gamut and the white point.

2. The liquid crystal display device according to claim 1, wherein the intermediate gray scale is an average of the initial gray scale of the target pixel and initial gray scales of U non-target pixels, and the target pixel and the U non-target pixels are located within a second filtering template, where U≥1.

3. The liquid crystal display device according to claim 2, wherein in any sub-field image of the $m^{th}$ image frame:
   an actual gray scale of at least one non-target pixel is an average of initial gray scales of W non-target pixels including the at least one non-target pixel and the actual gray scale of the target pixel, and the target pixel and the W non-target pixels are located within a third filtering template, where W≥2;
   wherein the third filtering template and the second filtering template have the same size.

4. The liquid crystal display device according to claim 2, wherein in any sub-field image of the $m^{th}$ image frame:
   an actual gray scale of at least one non-target pixel is an average of initial gray scales of W non-target pixels including the at least one non-target pixel, the W non-target pixels are located within a third filtering template, and the target pixel is located outside the third filtering template, where W≥2;
   wherein the third filtering template and the second filtering template have the same size.

5. The liquid crystal display device according to claim 1, wherein number of the reference points is three, and the three reference points respectively represent magenta, yellow, and cyan in the target color gamut.

6. The liquid crystal display device according to claim 1, wherein n is 3, and the base colors comprise red, green, and blue, and wherein the reference brightness of the target pixel and the initial gray scale of the target pixel satisfy a following relationship:

$$\text{gray} = k1 \times R + k2 \times G + k3 \times B;$$
$$\text{and } k1 < k3 < k2;$$

where gray represents the reference brightness of the target pixel, R represents the initial gray scale of the target pixel under red, G represents the initial gray scale of the target pixel under green, B represents the initial gray scale of the target pixel under blue, and k1, k3, and k2 are constants.

7. The liquid crystal display device according to claim 6, wherein k1 is 0.114, k2 is 0.587, and k3 is 0.2989.

8. The liquid crystal display device according to claim 6, wherein H is 4, and the contrast of the target pixel satisfies a following formula:

$$C = \frac{1}{4} \times \sum_{\Delta j=-1,1} (\text{gray}(i, j) - \text{gray}(i, j + \Delta j))^2 + \frac{1}{4} \times \sum_{\Delta i=-1,1} (\text{gray}(i, j) - \text{gray}(i + \Delta i, j))^2;$$

where C represents the contrast of the target pixel, gray (i, j) represents the reference brightness of the target pixel, gray (i, j+Δj) represents the reference brightness of a neighborhood pixel adjacent to the target pixel in a first direction, gray (i+Δi, j) represents the reference brightness of a neighborhood pixel adjacent to the target pixel in a second direction, and the first direction intersects with the second direction.

9. The liquid crystal display device according to claim 1, wherein 60≥brightness threshold≥20, and 900≥contrast threshold≥225, and wherein the reference brightness of the target pixel is calculated as gray=k1×R+k2×G+k3×B, where gray represents the reference brightness of the target pixel, R represents the initial gray scale of the target pixel under red, G represents the initial gray scale of the target pixel under green, B represents the initial gray scale of the target pixel under blue, and k1, k3, and k2 are constants.

10. The liquid crystal display device according to claim 1, wherein the control circuit further comprises a second operation mode, and in the second operation mode, the control circuit is configured to control, in response to receiving the display data of the $m^{th}$ image frame, the liquid crystal display device to display n sub-field images in sequence, to obtain the $m^{th}$ image frame; and wherein in the second operation mode, an actual gray scale of the pixel is an initial gray scale thereof.

11. The liquid crystal display device according to claim 1, wherein the liquid crystal display panel further comprises:

an array substrate and an opposed substrate arranged opposite to each other; and a liquid crystal layer arranged between the array substrate and the opposed substrate; and the liquid crystal display device further comprises:

a backlight module arranged on a side of the array substrate away from the opposed substrate, wherein the backlight module comprises light-emitting devices of n different colors, the backlight module emits light of the same color when displaying the same sub-field image, and emits light of different colors when displaying different sub-field images; and wherein the control circuit is connected to the array substrate and the backlight module.

12. An electronic device comprising a liquid crystal display device, wherein the liquid crystal display device comprises a liquid crystal display panel and a control circuit, and the liquid crystal display panel comprises multiple pixels;

wherein the control circuit comprises a first operation mode, and in the first operation mode, the control circuit is configured to control, in response to receiving display data of an $m^{th}$ image frame, the liquid crystal display device to display n sub-field images in sequence, to obtain the $m^{th}$ image frame, wherein the display data comprises initial gray scales of each pixel under n base colors, a tone of one sub-field image is one of the base colors, and tones of different sub-field images are different, where m and n are positive integers, and n≥2;

wherein in any sub-field image of the $m^{th}$ image frame:

the pixels comprise a target pixel and non-target pixels, the non-target pixels comprise multiple neighborhood pixels adjacent to the target pixel and non-neighborhood pixels located outside the neighborhood pixels, an actual gray scale of the target pixel is an average of an intermediate gray scale of the target pixel and initial gray scales of T non-target pixels, wherein the intermediate gray scale is determined based on an initial gray scale of the target pixel, the target pixel and the T non-target pixels are located within a first filtering template, and an actual gray scale of the at least a part of the non-target pixels is an initial gray scale thereof, where T≥1; and wherein the target pixel meets at least one of a first condition and a second condition, the first condition is that in a target color gamut in a reference color space, a distance between a target point that reflects a color of the target pixel and a white point is less than a distance threshold, and the second condition is that reference brightness of the target pixel, which is determined based on the initial gray scales of the target pixel under the n base colors, is greater than a brightness threshold, and/or, the second condition is that contrast of the target pixel, which is determined based on the reference brightness of the target pixel and reference brightness of H neighborhood pixels adjacent to the target pixel, is greater than a contrast threshold, where H≥1;

wherein the distance threshold is greater than or equal to Dmax and less than or equal to 1.4 Dmax, and Dmax is a maximum distance between multiple reference points within a boundary of the target color gamut and the white point.

13. The electronic device according to claim 12, further comprising:

an image acquisition device configured to collect user's eyeball images; and an image processing device configured to determine a movement speed of the eyeball based on the eyeball images, and control the control circuit to be in the first operation mode when the movement speed reaches a speed threshold.

14. A method for displaying an image, applied to a liquid crystal display device, wherein the liquid crystal display device comprises a liquid crystal display panel and a control circuit, the liquid crystal display panel comprises multiple pixels, and the method for displaying an image comprises:

in a first operation mode:

receiving display data of an $m^{th}$ image frame, wherein the display data comprises initial gray scales of each pixel under n base colors, where m and n are positive integers, and n≥2;

selecting, under each of the base colors, a pixel that meets at least one of a first condition and a second condition as a target pixel, wherein pixels other than the target pixel are determined as non-target pixels, pixels adjacent to the target pixel in the non-target pixels are determined as neighborhood pixels, and pixels located outside the neighborhood pixels in the non-target pixels are determined as non-neighborhood pixels, and wherein the first condition is that in a target color gamut in a reference color space, a distance between a target point that reflects a color of the target pixel and a white point is less than a distance threshold, and the second condition is that reference brightness of the target pixel, which is determined based on the initial gray scales of the target pixel under the n base colors, is greater than a brightness threshold, and/or, the second condition is that contrast of the target pixel, which is determined based on the reference brightness of the target pixel and reference brightness of H neighborhood pixels adjacent to the target pixel, is greater than a contrast threshold, where H≥1;

executing a display step under each of the base colors, to obtain the $m^{th}$ image frame, wherein the display step comprises:

determining an average of an intermediate gray scale of the target pixel and initial gray scales of T non-target pixels within a first filtering template as an actual gray scale of the target pixel, and determining an initial gray scale of at least a part of the non-target pixels as an actual gray scale thereof, to display a sub-field image of the $m^{th}$ image frame, wherein the intermediate gray scale is determined based on an initial gray scale of the target pixel, a tone of one sub-field image is one of the base colors, and tones of different sub-field images are different, where $T \geq 1$;

wherein the distance threshold is greater than or equal to Dmax and less than or equal to 1.4 Dmax, and Dmax is a maximum distance between multiple reference points within a boundary of the target color gamut and the white point.

15. The method for displaying an image according to claim 14, wherein determining the average of the intermediate gray scale of the target pixel and the initial gray scales of the T non-target pixels within the first filtering template as the actual gray scale of the target pixel, comprises:

determining an average of the initial gray scale of the target pixel and initial gray scales of U non-target pixels as the intermediate gray scale, wherein the target pixel and the U non-target pixels are located within a second filtering template, where $U \geq 1$; and determining the average of the intermediate gray scale and the initial gray scales of the T non-target pixels within the first filtering template as the actual gray scale of the target pixel.

16. The method for displaying an image according to claim 15, wherein the display step further comprises:

determining an average of initial gray scales of W non-target pixels and the actual gray scale of the target pixel as an actual gray scale of at least one of the W non-target pixels, where $W \geq 2$, wherein the target pixel and the W non-target pixels are located within a third filtering template, and the third filtering template and the second filtering template have the same size.

17. The method for displaying an image according to claim 15, wherein the display step further comprises:

determining an average of initial gray scales of W non-target pixels as an actual gray scale of at least one of the W non-target pixels, where $W \geq 2$, wherein the W non-target pixels are located within a third filtering template, the target pixel is located outside the third filtering template, and the third filtering template and the second filtering template have the same size.

18. The method for displaying an image according to claim 14, wherein in a second operation mode:

receiving the display data of the $m^{th}$ image frame; and displaying, under each of the base colors, n sub-field images in sequence using the initial gray scale of the pixel as an actual gray scale thereof to obtain the $m^{th}$ image frame.

19. A non-transitory computer-readable storage medium having a computer program stored thereon, wherein the method for displaying an image according to claim 14 is implemented when the computer program is executed by a processor.

* * * * *